Oct. 4, 1966   W. F. JACOBS   3,276,729
AERIAL DELIVERY SYSTEM
Filed Dec. 18, 1964   3 Sheets-Sheet 1

INVENTOR.
WILLI F. JACOBS
BY
George Sullivan
Agent

Oct. 4, 1966 W. F. JACOBS 3,276,729
AERIAL DELIVERY SYSTEM
Filed Dec. 18, 1964 3 Sheets-Sheet 2

INVENTOR.
WILLI F. JACOBS
BY
*George A Sullivan*
Agent

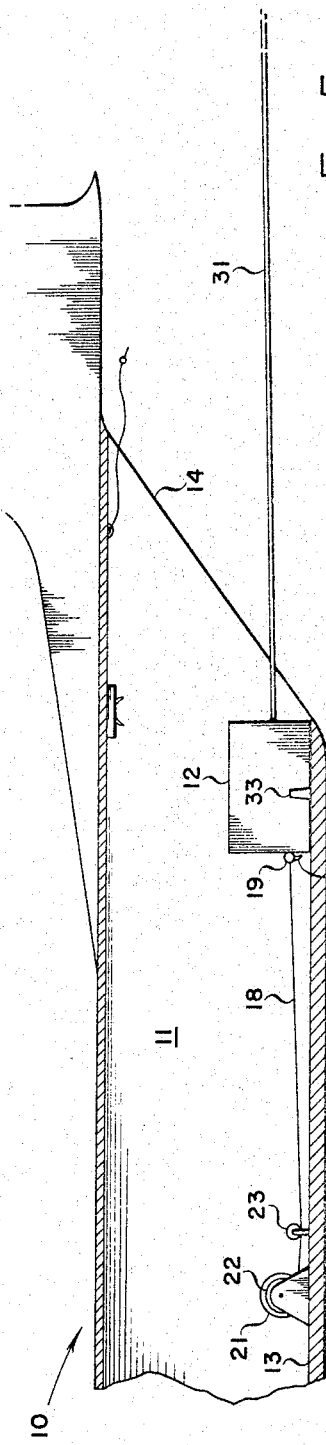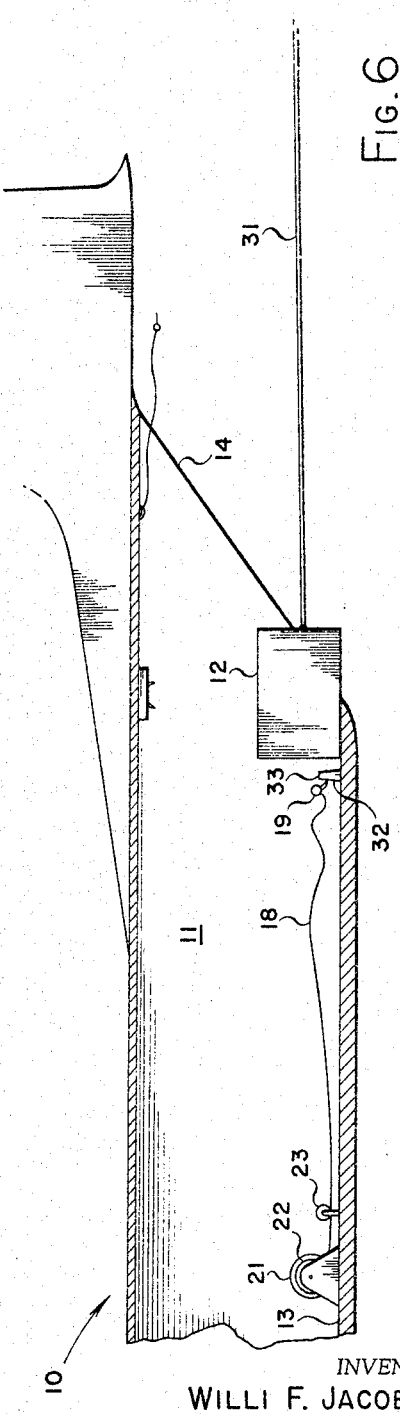

United States Patent Office
3,276,729
Patented Oct. 4, 1966

3,276,729
AERIAL DELIVERY SYSTEM
Willi F. Jacobs, Atlanta, Ga., assignor to Lockheed Aircraft Corporation, Burbank, Calif.
Filed Dec. 18, 1964, Ser. No. 419,395
7 Claims. (Cl. 244—137)

This invention relates broadly to aerial delivery systems, i.e., systems by which cargo is jettisoned or dropped from aircraft during flight and carried to a selected ground station or target area, and more particularly to such a system by which the deceleration of such cargo during its descent is prolonged or sustained over a greater time period resulting in a lower impact or terminal velocity of the cargo.

Aerial delivery systems based on parachute drag forces for the deceleration of cargo carried thereby have inherent limitations due to the fact that the drag forces are proportional to the square of the parachute velocity. The parachute drag forces thus decrease rapidly with decrease in speed which limits the impact or terminal velocity of these conventional systems to speeds below which it is presently impossible to go.

Schemes heretofore proposed to overcome the foregoing limitations of parachute systems have been largely centered around shock absorbing mechanisms incorporated in the system between the cargo and the ground or impact surface and/or between the parachute and the cargo. These prior proposals are therefore directed toward minimizing the effect of impact or sudden thrust on the cargo rather than any attempt to prevent the rapid decrease of parachute velocity to the end that lower impact forces on the cargo can be obtained.

The present invention thus contemplates a totally new approach to these shortcomings in parachute delivery systems. In essence, it is herein proposed to prolong or sustain the drag forces produced by the parachute in aerial deliveries at or near their maximum and thereby effect greater deceleration and a lower terminal velocity of the cargo. At the same time, such operation lends itself to greater control and accuracy than heretofore obtainable of the delivery of the cargo from its stored position within an aircraft or carrier to its ultimate resting location in a selected target area.

More specifically, the instant invention has in view an aerial delivery system incorporating means by which energy is stored therein prior to the disconnection or complete separation of the cargo from the aircraft together with means to release such stored energy subsequently during the cargo deceleration process. To this end a resilient or elastic line is employed between the parachute and its cargo or load and releasable restraining means of predetermined load retention strength connected to the load or cargo. Thus, drag forces acting on the parachute when separated from the aircraft initially serve to place the line under tension and then with the line under the desired tension extract the cargo from the aircraft. During such extraction the restraining means is released from the cargo so that when the parachute drag forces begin to decrease the tension in the line is relieved to effect an increase in the parachute velocity and sustain the drag forces thereon for an extended period.

With the above and other objects in view as will be apparent this invention consists in the construction, combination and arrangement of parts all as hereinafter more fully described, claimed and illustrated in the accompanying drawings wherein:

FIGURE 5 is a similar view thereof after the cargo restraining means has been overpowered by the drag forces on the parachute whereby the cargo has moved outwardly of the aircraft;

FIGURE 6 is a similar view thereof upon complete release of the cargo restraining means permitting separation of the cargo from the aircraft.

Figure 1:
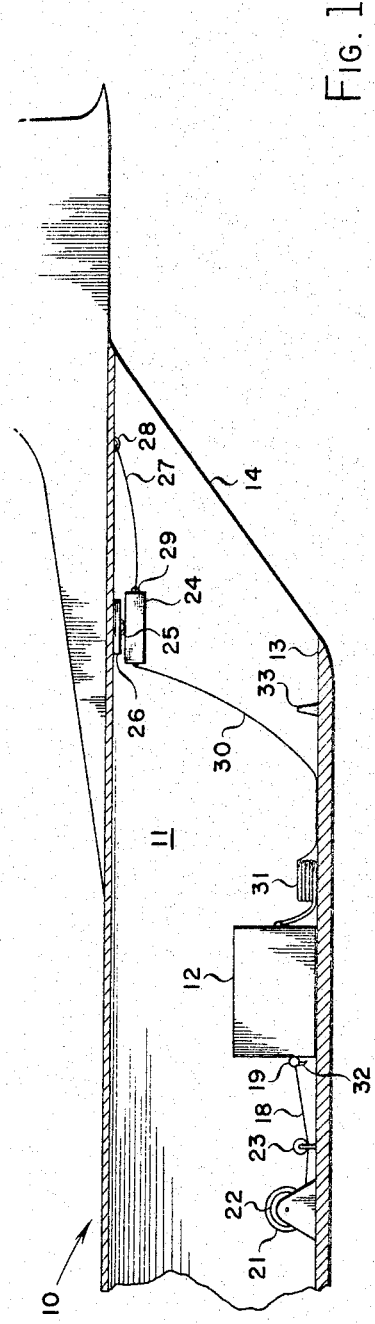
FIGURE 1 is a schematic view of an aerial delivery system organized and arranged in accordance with the teachings of this invention to show a preferred embodiment thereof as incorporated in an aircraft or carrier and stowed therein prior to initiation of the separation and release sequence, only a fragment of the aircraft being shown.
Figure 2:
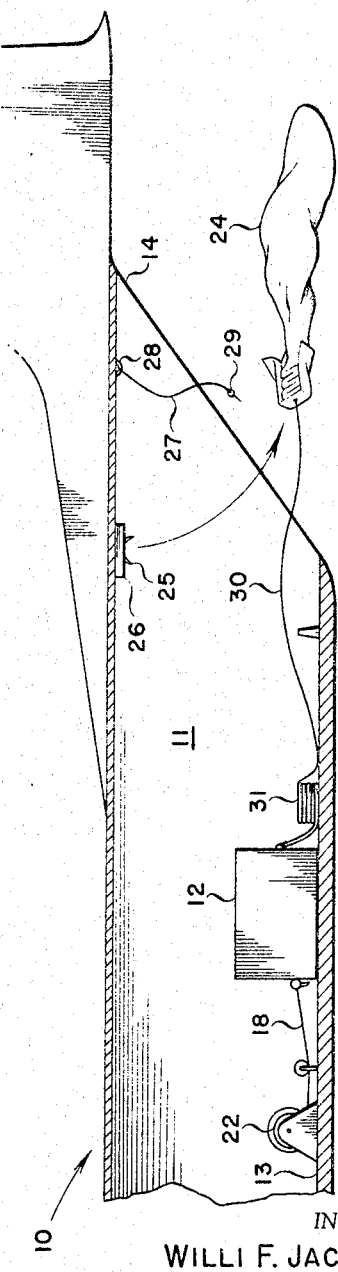
FIGURE 2 is a similar view thereof upon initiation of the separation and release sequence with the disengagement and ejection of the parachute pack from the aircraft.
Figure 3:
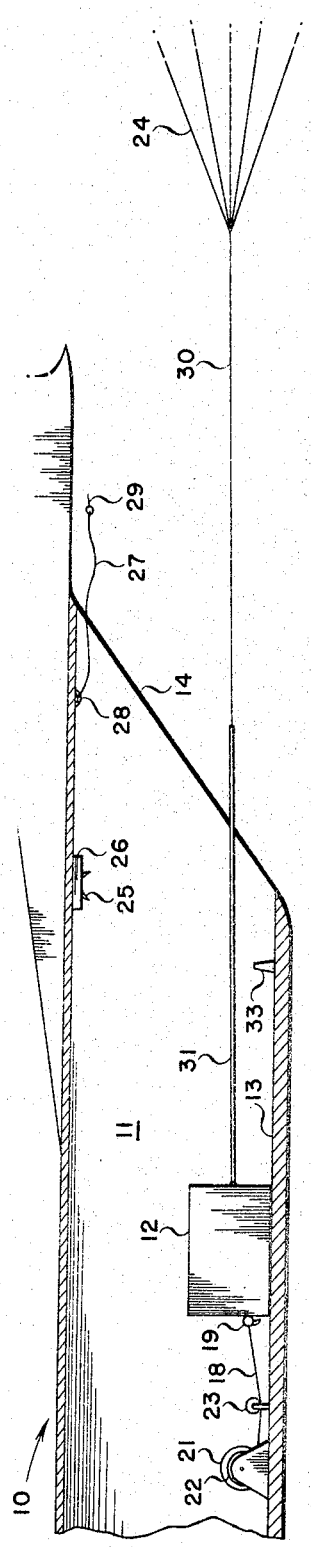
FIGURE 3 is a similar view thereof after the parachute has been fully deployed whereby the drag forces thereof act in opposition to cargo restraining means to place the resilient or elastic line under tension.
Figure 4:
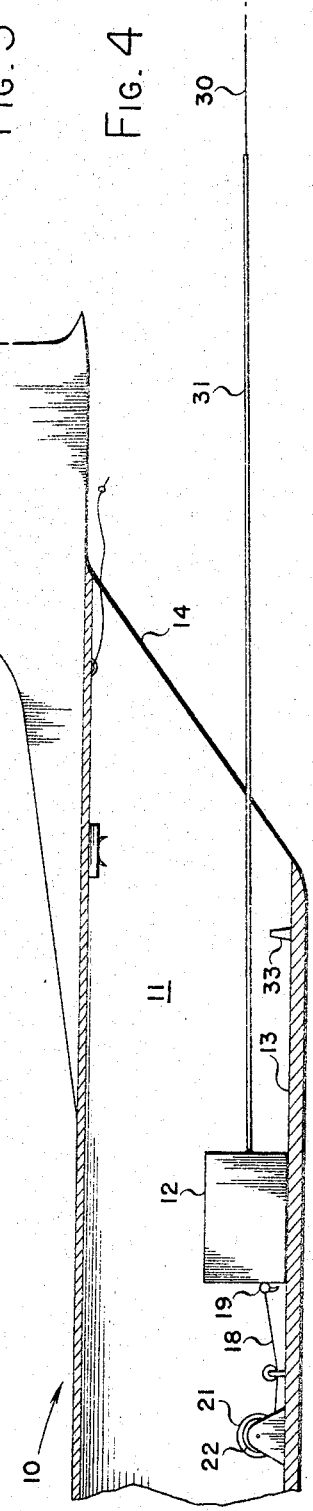
FIGURE 4 is a similar view thereof after the elastic line has been loaded in tension.
Figure 7:
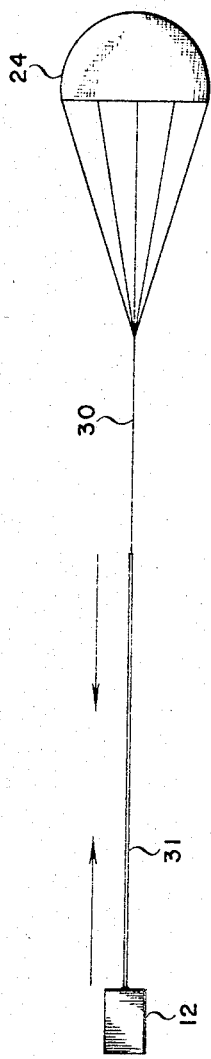
FIGURE 7 is a similar view after the tension in the elastic line has been relieved effecting an increase in the parachute speed to thereby prolong the level of drag forces acting thereon.

With more particular reference to the drawings, 10 designates a fragment of an aircraft defining a storage compartment 11 for cargo 12 to be dropped or ejected therefrom during flight. An appropriate conveyor may be employed on the deck of a floor 13 of the compartment 11 to support the cargo 12 and facilitate its movement into and out of the aircraft 10. Suitable tracks and/or guide means well known in the art may be associated with such conveyor to secure the cargo 12 against relative lateral movement and to establish the path of movement thereof in and out of the compartment 11. Such conveyor, track and guide means, etc., per se forms no part of the present invention and has therefore been omitted from the drawings lest it only confuse and detract from the essentials of the proposed aerial delivery system.

An opening 14 in the aircraft 10 provides access to the interior of the compartment 11 as well as a passage through which the cargo 12 may be moved. A door mounted in conventional manner on the aircraft adjacent the opening 14 for movement to and from positions of open and closed is provided at the aft end of the compartment 11. Movement of this door to and from open and closed positions is appropriately controlled by any conventional means. As in the case of the conveyor and its associated structure, this door, its structure, mounting and operation per se is not a part of the invention and has not been shown.

The cargo 12 is normally secured against linear movement on the floor 13 by a cable 18 terminating at one of its ends in a releasable connector 19 adapted to coact with suitable fitting means carried by the cargo 12. At its other end the cable 18 is appropriately connected to and wound on the drum of a winch 21. An adjustable brake 22 is associated with the winch 21 to prevent the unrestricted unwinding thereof and maintain the cable 18 taut. Guide means in the form of rollers 23 secured to aircraft structure are interposed between the cargo 12 and winch 21 to insure the proper alignment of the cable 18 with respect to the cargo 12.

Independently mounted within the cargo compartment 11 on the upper wall thereof adjacent the opening 14 is a parachute 24 folded in conventional manner to form a pack secured by a releasable connector 25 to a supporting rack 26. A link or cord 27 pivotally connects this parachute pack to a support or fitting 28 on aircraft structure in a suspended position whereby it swings like a pendulum by gravity in an arc out of the compartment 11 through opening 14 upon release of the connector 25 by any conventional or known means. The link 27 is designed to release through separation means 29 the parachute 24 allowing it to unfold when it reaches or is adjacent the bottom or lowest level in its swing. The parachute 24 is thereby freed from the aircraft 10 and disposed in the slip stream thereof which carries it in a rearward direction away from the aircraft where it is ultimately fully deployed.

An extraction line 30 connects the chute 24 to the cargo 12, and upon deployment of the parachute 24 as above described, this line 30 is withdrawn from the compartment 11. The line 30 is fabricated of resilient or elastic material at least in part comprising for example a bungee 31 which is stretched or loaded in tension prior to movement of the cargo 12 due to the restraining forces imposed thereon by the cable 18 which forces exceed the forces required to load the bungee 31.

As the bungee 31 becomes extended, however, the drag forces acting on the deployed chute 24 eventually exceed the restraining or retention forces of the cable 18 as established by the adjustment of the brake 22 whereby the cargo 12 is pulled or extracted from the compartment 11. The winch 21 thereafter unwinds paying out the cable 18 until such time as the connector 19 releases the cargo 12 therefrom. To effect this the connector 19 is provided with an actuator or trigger 32 projecting therefrom for contact with an obstruction or trip 33 secured to the aircraft structure and disposed in the path of the trigger 32 as it moves with the cargo 12 during its extraction from the compartment 11.

The cargo 12 being thus separated from the aircraft 10 and the restraining forces of the cable 18 having been removed, the stretched bungee 31 is now free tending to resume its natural position. Thus, the energy which theretofore had been stored in the bungee 31 is released tending to effect the movement of the cargo 12 and chute 24 toward each other. As the drag forces acting on the chute 24 decrease, this action of the bungee 31 serves to accelerate the chute 24 to thereby sustain such drag forces for an extended period. This has the effect of additionally slowing the horizontal speed of the cargo 12.

It should be understood, of course, that the foregoing specifically describes only a preferred embodiment of the invention and that numerous modifications or alterations may be made therein without departing from the spirit and scope of the invention as set forth in the appended claims.

What is claimed is:

1. A delivery system for cargo from an aircraft during flight comprising a parachute, an extraction line connecting said parachute to the cargo to be delivered, said line being fabricated at least in part of resilient material, means releasing said parachute from the aircraft for deployment into the airstream, and cargo retention means operative in opposition to the drag forces imposed on said parachute when deployed, the force of said retention means being less than said drag forces but exceeding that required to place said line under tension.

2. The system of claim 1 including release means to render said cargo retention means inoperative when said line is placed under predetermined tension.

3. The system of claim 1 wherein said resilient material is a bungee.

4. The system of claim 1 including adjustable means for regulating the force of said retention means.

5. The system of claim 1 wherein said cargo retention means comprises a cable, a connector between said cable and said cargo, and a release for said connector.

6. The system of claim 1 wherein said cargo retention means comprises a winch, a cable wound on said winch and releasably connected at its free end to said cargo, an adjustable brake operatively connected to said winch to control the unwinding of said cable, and guide means interposed between said winch and said cargo to establish and maintain the position and plane of the cable relative thereto.

7. The system of claim 4 wherein said release comprises an actuator carried by said connector, and a trip disposed in alignment with said actuator.

No references cited.

MILTON BUCHLER, *Primary Examiner.*

A. E. CORRIGAN, *Assistant Examiner.*